(12) United States Patent
Fraundorfer et al.

(10) Patent No.: US 7,567,627 B1
(45) Date of Patent: Jul. 28, 2009

(54) ESTIMATING THE LOCATION OF A TRANSMITTER ACCORDING TO PHASE DIFFERENCES

(75) Inventors: Joseph J. Fraundorfer, Bethesda, MD (US); Darrell L. Young, Falls Church, VA (US); Frank A. Birdsong, Jr., Alexandria, VA (US)

(73) Assignee: Raytheon Company, Waltham, MA (US)

( * ) Notice: Subject to any disclaimer, the term of this patent is extended or adjusted under 35 U.S.C. 154(b) by 667 days.

(21) Appl. No.: 11/268,122

(22) Filed: Nov. 7, 2005

(51) Int. Cl.
*H03K 9/00* (2006.01)
(52) U.S. Cl. ............... 375/316; 375/347; 455/456.6
(58) Field of Classification Search ............ 375/316, 375/347; 455/456.6
See application file for complete search history.

(56) References Cited

U.S. PATENT DOCUMENTS 6,414,673 B1 * 7/2002 Wood et al. ............... 345/173

OTHER PUBLICATIONS

Lu Rarogiewicz, "*Interferometry 101: How light is combined from multiple telescopes*", http://www.space.com/scienceastronomy/astronomy/interferometry_101.html, 6 pages, Jul. 5, 2001.
Catherine E. Towers, et al., "*Time efficient Chinese remainder theorem algorithm for full-field fringe phase analysis in multi-wavelength interferometry*", Optics Express, vol. 12, No. 6, © 2004 Optical Society of America, pp. 1136-1143, Mar. 22, 2004.
F. Rocca, et al., "*An Overview of SAR Interferometry*", Earth Observation, Earthnet Online, http://earth.esa.int/workshops/ers97/program-details/speeches/rocca-et-al/, 25 pages, Oct. 28, 2005.

\* cited by examiner

*Primary Examiner*—Kevin Y Kim
(74) *Attorney, Agent, or Firm*—Baker Botts L.L.P.

(57) ABSTRACT

The location of a transmitter transmitting a signal may be estimated by receiving the signal at each receiver of a plurality of receivers, where the receivers are in motion relative to the transmitter. The following are performed for pairs of receivers to yield phase differences: establishing a first phase offset of the signal as received at a first receiver; establishing a second phase offset of the signal as received at a second receiver; and determining a phase difference corresponding to the pair of receivers in accordance with the first phase offset and the second phase offset. A location of the transmitter is estimated in accordance with the plurality of phase differences.

18 Claims, 1 Drawing Sheet

ESTIMATING THE LOCATION OF A TRANSMITTER ACCORDING TO PHASE DIFFERENCES

TECHNICAL FIELD

This invention relates generally to the field of location devices and more specifically to estimating the location of a transmitter according to phase differences.

BACKGROUND

Receivers may be used to estimate the location of a transmitter using a signal transmitted by the transmitter. As an example, receivers mounted on aircraft may be used to estimate the location of a transmitter on the ground. Known techniques may use differences between the signals as received by different receivers to estimate the location. According to a time difference of arrival technique, the difference in arrival times of the signal may be used to estimate the location. According to a frequency difference of arrival technique, the difference in the frequencies of the signal may be used to estimate the location. Known techniques, however, are not satisfactory in certain situations.

SUMMARY OF THE DISCLOSURE

In accordance with the present invention, disadvantages and problems associated with previous techniques for estimating the location of a transmitter may be reduced or eliminated.

According to one embodiment of the present invention, the location of a transmitter transmitting a signal may be estimated by receiving the signal at each receiver of a plurality of receivers, where the receivers are in motion relative to the transmitter. The following are performed for pairs of receivers to yield phase differences: establishing a first phase offset of the signal as received at a first receiver; establishing a second phase offset of the signal as received at a second receiver; and determining a phase difference corresponding to the pair of receivers in accordance with the first phase offset and the second phase offset. A location of the transmitter is estimated in accordance with the plurality of phase differences.

Certain embodiments of the invention may provide one or more technical advantages. A technical advantage of one embodiment may be that the location of a transmitter transmitting a signal may be estimated from phase differences determined from the phase offsets of the signal arriving at different receivers. Another technical advantage of one embodiment may be that a modulo technique may be performed to establish that the phase differences are due to the same cycle of a signal envelope of the signal.

Another technical advantage of one embodiment may be that the receivers may be in motion relative to the transmitter, where may allow for more efficient detection of the transmitter. The separation between the receivers may be increased, which may improve the accuracy of the estimate.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
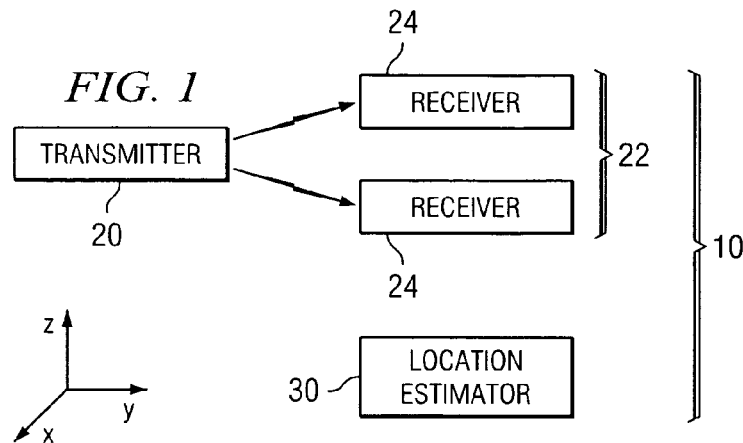
FIG. 1 is a block diagram illustrating one embodiment of a system that includes a location estimator operable to estimate the location of a transmitter.
Figure 2:
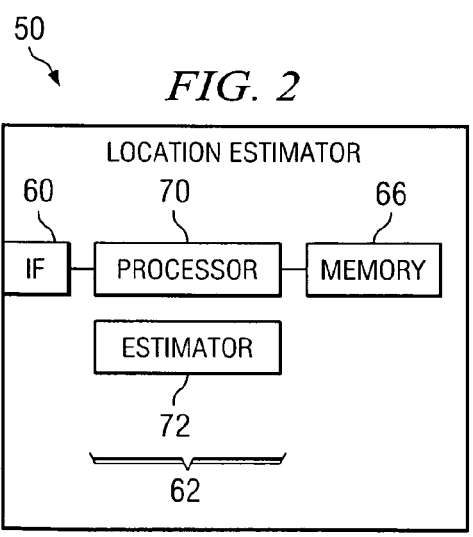
FIG. 2 is a block diagram illustrating one embodiment of a location estimator that may be used with the system of FIG. 1.
Figure 3:
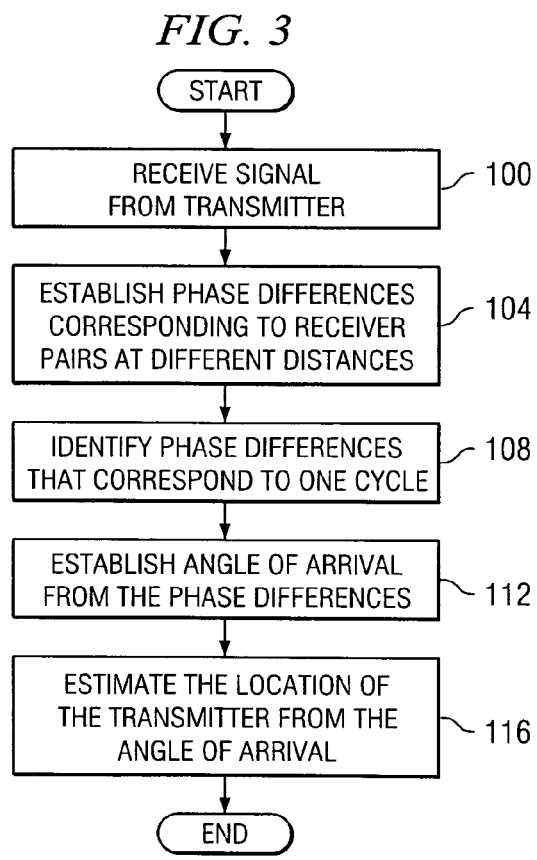
FIG. 3 is a flowchart illustrating one embodiment of a method for estimating the location of a transmitter that may be used with the system of FIG. 1.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system that includes a location estimator. The location estimator estimates the location of a transmitter that transmits a signal to receivers of a receiver array. In general, phase differences are determined from the phase offsets of the signal at the receivers, and the location is estimated according to the phase differences. A modulo technique may be performed to establish that the phase differences are due to the same cycle of a signal envelope of the signal. The receivers may be in motion relative to the transmitter.

According to the illustrated embodiment, a transmitter 20 transmits a signal that is received by system 10. Transmitter 20 may generate a signal or may reflect a signal that was generated elsewhere. A signal refers to a physical or electrical quantity that may be used to convey information. For example, a signal may refer to an acoustic or electrical signal. A signal includes signal envelopes, or signal waves, and a signal envelope includes signal cycles. A signal may have any suitable frequency and any suitable duration.

According to the illustrated embodiment, an xy-plane may be substantially parallel to the surface of the ground, and may be used to measure ground position. A z-axis may be substantially perpendicular to the surface of the ground, and may be used to measure altitude. According to one embodiment, transmitter 20 may be stationary with respect to the earth and may be located at or near the surface of the earth.

System 10 includes a receiver array 24 and a location estimator 30. Receiver array 24 includes a plurality of receivers 22. A receiver 24 may include at least one sensor operable to detect a signal, for example, a radio frequency (RF), electro-optical (EO), infrared (IR), optical, acoustic, other sensor, or any combination of the proceeding. As an example, a receiver 24 may comprise an ultra-wideband (UWB) ranging device.

Receivers 24 sample the signal received from transmitter 20. According to one embodiment, receiver 24 may only be required to sample one cycle per signal envelope. Receivers 24 may be synchronized at a suitable level of precision that allows for appropriate sampling. As an example, a signal envelope may have a million cycles, so receivers 24 may be synchronized in order to allow for selection of a particular cycle to sample. Receivers 24 may be phase-locked to each other with precise clocks.

The signal is sampled to determine the phase offset of the signal. The phase offset refers to the degrees out of phase of the signal wave. The phase difference between phase offsets at receivers 24 of a pair of receivers 24 may be used to estimate the location. According to one embodiment, phase differences are determined for receiver pairs, where the receivers 24 are at different distances. As an example, a first phase difference may be determined for a receiver pair at a first distance, and a second phase difference may be determined for the receiver pair at a second distance. As another example, a first phase difference may be determined for a first receiver pair at a first distance, and a second phase difference may be determined for a second pair at a second distance.

According to one embodiment, the first distance is a relative co-prime of the second distance. A first number is a relative co-prime of a second number if the only common factor of the two numbers is a prime number. According to the embodiment, the distances between the receivers may be required to be known to a certain precision in accordance with the wavelength of the signal. As an example, the precision may be some fraction of the wavelength of the signal, for example, a tenth of a wavelength.

Receivers 22 may be arranged in any suitable manner. For example, receivers 22 may be arranged in a planar, spherical, or parabolic shape centered about the area to be imaged. Receivers 22 may be positioned to make particular measurements. As an example, receivers 24 at the same z position but different xy positions may be used to estimate a location in the xy-plane. As another example, receivers 24 at the same xy position but different z positions may be used to estimate a location along the z-axis.

Receivers 22 may move relative to each other. For example, a pair of receivers 22 may move closer together or farther apart. According to one embodiment, increasing the distance between receivers 24 may improve the accuracy for determining the angle of arrival, which is used to estimate the location of transmitter 20.

The accuracy of the angle of arrival may be give by the following equation:

$$\text{angle accuracy} = \frac{\lambda}{2\pi D \cos(\beta)} \Delta\theta$$

where $\lambda$ represents the wavelength of the signal, D represents the distance between the receivers, and $\beta$ represents the angle off boresight, and $\Delta\theta$ represents the degree to which the angle off boresight $\beta$ may be measured. According to the equation, an increase in the distance D improves the accuracy.

A typical acceptable accuracy is a tenth of a degree. Generally, the distance required to achieve this accuracy is approximately 25 times the wavelength. For example, a distance of approximately 700 feet may be required for a wavelength of approximately 30 feet.

Receivers 22 may move to change the shape of receiver array 24. For example, receivers 22 may be change from a spherical shape to a parabolic shape. Receivers 22 may be in motion relative to transmitter 20, and may move in any combination of x, y, and z directions. For example, transmitter 20 may be at or near the ground, and receiver array 24 may be at position of the z-axis and the move to another position of the z-axis. Receivers 24 may make successive measurements at different locations to estimate the location of one or more transmitters 20. The measurements may cover a wide geographic area in order to map the locations of transmitters 20 in the area.

A receiver 24 may be coupled to any suitable platform. Example platforms may include aircraft, automobiles, marine craft, human beings, or other object operable to move across the ground, through the water, or through the air. Receivers 24 may be mounted to the same type of platform or may be mounted to different types of platforms.

Location estimator 30 receives information from receivers 24, and estimates the location of transmitter 20 from the information. Location estimator 30 may be located at any suitable place. In one embodiment, location estimator 30 may be located on a receiver platform. In another embodiment, location estimator 30 may be located apart from any other receiver platforms. For example, receivers 24 may be located in moving vehicles, where location estimator 30 may be located at a ground station. An example location estimator 30 is described with reference to FIG. 2.

The components of system 10 may communicate with each other via, for example, a wireless network. Any suitable data rate that allows for appropriate updating of information among the components of system 10 may be used, for example, approximately 10 megabits per second.

One or more components of system 10 may include appropriate input devices, output devices, mass storage media, processors, memory, or other components for receiving, processing, storing, and communicating information according to the operation of system 10.

As an example, one or more components of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of a location estimator that may be used with the system of FIG. 1. According to the illustrated embodiment, location estimator 50 includes an interface 60, logic 62, and a memory 66.

Logic 62 includes a processor 70 and an estimating engine 72. Estimating engine 72 estimates the location of transmitter 20, and may use any suitable method to estimate the location of transmitter 20. An example method is described in more detail with reference to FIG. 3.

According to one embodiment, receivers 24 receive a signal. Phase differences of the signal corresponding to pairs of receivers are determined. A phase difference corresponding to a receiver pair may be determined by calculating a difference between a first phase offset of the signal as received at a first receiver and a second phase offset of the signal as received at a second receiver.

The phase difference corresponds to a time difference. The time difference may refer to the difference between the arrival time of an envelope at one receiver and the arrival time of the envelope at another receiver. The phase difference describes the difference in phase offsets at different receivers, which can be converted to the difference in arrival times at the different receivers.

The time difference may be converted to an angle of arrival. The angle of arrival refers to the angle where the signal is relative to the receivers. The signal arrives at a receiver closer to transmitter 20 before arriving at a receiver that is farther from transmitter 20. Given the speed of the signal, the angle of arrival can be estimated for the difference in arrival times. The location of transmitter 20 may be estimated from the angle of arrival.

A modulo technique such as a Chinese remainder technique may be used to determine if phase differences correspond to one cycle. A modulo technique may refer to a technique that analyzes modulo remainders. According to one embodiment, a first phase difference and a second phase difference are determined for receiver pairs at different distances, where the distances are relative co-primes. If phase differences correspond to one cycle, then the second phase difference is predictable from the first phase difference. Accordingly, if the actual second phase difference does not match the predicted phase difference, then the phase differences do not correspond to one cycle. Conversely, if the actual second phase difference matches the predicted phase difference, then the phase differences correspond to one cycle.

Modifications, additions, or omissions may be made to location estimator 50 without departing from the scope of the invention. The components of location estimator 50 may be integrated or separated according to particular needs. Moreover, the operations of location estimator 50 may be performed by more, fewer, or other modules. Additionally, operations of location estimator 50 may be performed using any suitable logic.

FIG. 3 is a flowchart illustrating one embodiment of a method for estimating the location of a transmitter that may be used with the system of FIG. 1. The method starts at step 100, where receivers 24 receive a signal transmitted by transmitter 20. Phase differences corresponding to receiver pairs at different distances are established at step 104. Phase differences may be established from a receiver pair that is separated by one distance and then another distance, or may be established from different receiver pairs separated by different distances. The distance may be co-primes of each other. According to the embodiment, measurements may be taken at several distances, and measurements taken at co-prime distances may be selected for analysis.

Phase differences that correspond to one cycle are identified at step 108. According to one embodiment, a modulo technique may be used to determine if a phase difference corresponds to one cycle. If phase differences correspond to one cycle, then the second phase difference is predictable from the first phase difference. Accordingly, if the actual second phase difference matches the predicted phase difference, then the phase differences correspond to one cycle.

The angle of arrival is estimated from the identified phase difference at step 112. According to one embodiment, the phase different corresponds to a time difference from which an angle of arrival may be determined. Steps 104 through 112 may be repeated for any suitable number of iterations to improve the estimate of the location. The location of transmitter 20 is estimated from the angle of arrival at step 116. After estimating the location, the method ends.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that the location of a transmitter transmitting a signal may be estimated from phase differences determined from the phase offsets of the signal arriving at different receivers. Another technical advantage of one embodiment may be that a modulo technique may be performed to establish that the phase differences are due to the same cycle of a signal envelope of the signal.

Another technical advantage of one embodiment may be that the receivers may be in motion relative to the transmitter, where may allow for more efficient detection of the transmitter. The separation between the receivers may be increased, which may improve the accuracy of the estimate.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for estimating the location of a transmitter, comprising:
   receiving a signal at each receiver of a plurality of receivers, the signal transmitted by a transmitter, the plurality of receivers in motion relative to the transmitter;
   performing the following for a plurality of pairs of receivers of the plurality of receivers to yield a plurality of phase differences:
      establishing a first phase offset of the signal as received at a first receiver of a first pair of receivers;
      establishing a second phase offset of the signal as received at a second receiver of the first pair of receivers; and
      determining a first phase difference corresponding to the first pair of receivers in accordance with the first phase offset and the second phase offset;
   determining a second phase difference corresponding to a second pair of receivers in the same manner as the first phase difference was determined;
   predicting a predicted second phase difference;
   establishing that the first phase difference and the second phase difference correspond to the same cycle of a signal envelope of the signal if the second phase difference matches the predicted second phase difference; and
   estimating a location of the transmitter in accordance with the plurality of phase differences.

2. The method of claim 1, wherein estimating a location of the transmitter in accordance with the plurality of phase differences further comprises:
   determining one or more angles of arrival corresponding to a phase difference of the plurality of phase differences; and
   estimating the location of the transmitter in accordance with the one or more angles of arrival.

3. The method of claim 1, further comprising establishing that a first phase difference and a second phase difference of the plurality of phase differences correspond to the same cycle of a signal envelope of the signal.

4. A method for estimating the location of a transmitter, comprising:
- receiving a signal at each receiver of a plurality of receivers, the signal transmitted by a transmitter, the plurality of receivers in motion relative to the transmitter;
- performing the following for a plurality of pairs of receivers of the plurality of receivers to yield a plurality of phase differences:
  - establishing a first phase offset of the signal as received at a first receiver of a pair of receivers;
  - establishing a second phase offset of the signal as received at a second receiver of the pair of receivers;
  - determining a phase difference corresponding to the pair of receivers in accordance with the first phase offset and the second phase offset;
- determining a first phase difference corresponding to a pair of receivers separated by a first distance;
- determining a second phase difference corresponding to a pair of receivers separated by a second distance;
- performing a modulo technique on the first phase difference and the second phase difference;
- establishing that the first phase difference and the second phase difference correspond to the same cycle of a signal envelope of the signal in accordance with the modulo technique; and
- estimating a location of the transmitter in accordance with the plurality of phase differences.

5. The method of claim 1, wherein:
- the receivers of a pair of receivers corresponding to a first phase difference are separated by a first distance; and
- the receivers of a pair of receivers corresponding to a second phase difference are separated by a second distance, the second distance being a relative co-prime of the first distance.

6. The method of claim 1, wherein:
- the receivers of a first pair of receivers corresponding to a first phase difference are separated by a first distance; and
- the receivers of a second pair of receivers corresponding to a second phase difference are separated by a second distance, the first pair of receivers distinct from the second pair of receivers.

7. The method of claim 1, wherein:
- the receivers of a pair of receivers corresponding to a first phase difference are separated by a first distance; and
- the receivers of the pair of receivers corresponding to a second phase difference are separated by a second distance.

8. The method of claim 1, wherein:
- the plurality of receivers are coupled to a plurality of moving platforms; and
- the transmitter is coupled to a surface-based platform.

9. A system for estimating the location of a transmitter, comprising:
- a plurality of receivers, each receiver of the plurality of receivers operable to receive a signal, the signal transmitted by a transmitter, the plurality of receivers in motion relative to the transmitter; and
- a location estimator in communication with at least one receiver of the plurality of receivers, the location estimator operable to:
  - perform the following for a plurality of pairs of receivers of the plurality of receivers to yield a plurality of phase differences:
    - establish a first phase offset of the signal as received at a first receiver of a first pair of receivers;
    - establish a second phase offset of the signal as received at a second receiver of the first pair of receivers; and
    - determine a first phase difference corresponding to the first pair of receivers in accordance with the first phase offset and the second phase offset;
  - determine a second phase difference corresponding to a second pair of receivers in the same manner as the first phase difference was determined;
  - predict a predicted second phase difference; and
  - establish that the first phase difference and the second phase difference correspond to the same cycle of a signal envelope of the signal if the second phase difference matches the predicted second phase difference; and
  - estimate a location of the transmitter in accordance with the plurality of phase differences.

10. The system of claim 9, the location estimator operable to estimate a location of the transmitter in accordance with the plurality of phase differences by:
- determining one or more angles of arrival corresponding to a phase difference of the plurality of phase differences; and
- estimating the location of the transmitter in accordance with the one or more angles of arrival.

11. The system of claim 9, the location estimator further operable to establish that a first phase difference and a second phase difference of the plurality of phase differences correspond to the same cycle of a signal envelope of the signal.

12. A system for estimating the location of a transmitter, comprising:
- a plurality of receivers, each receiver of the plurality of receivers operable to receive a signal, the signal transmitted by a transmitter, the plurality of receivers in motion relative to the transmitter; and
- a location estimator in communication with at least one receiver of the plurality of receivers, the location estimator operable to:
  - perform the following for a plurality of pairs of receivers of the plurality of receivers to yield a plurality of phase differences:
    - establish a first phase offset of the signal as received at a first receiver of a pair of receivers;
    - establish a second phase offset of the signal as received at a second receiver of the pair of receivers; and
    - determine a phase difference corresponding to the pair of receivers in accordance with the first phase offset and the second phase offset;
  - determine a first phase difference corresponding to a pair of receivers separated by a first distance;
  - determine a second phase difference corresponding to a pair of receivers separated by a second distance;
  - perform a modulo technique on the first phase difference and the second phase difference; and
  - establish that the first phase difference and the second phase difference correspond to the same cycle of a signal envelope of the signal in accordance with the modulo technique; and
  - estimate a location of the transmitter in accordance with the plurality of phase differences.

13. The system of claim 9, wherein:
- the receivers of a pair of receivers corresponding to a first phase difference are separated by a first distance; and the receivers of a pair of receivers corresponding to a second phase difference are separated by a second distance, the second distance being a relative co-prime of the first distance.

14. The system of claim 9, wherein:

the receivers of a first pair of receivers corresponding to a first phase difference are separated by a first distance; and the receivers of a second pair of receivers corresponding to a second phase difference are separated by a second distance, the first pair of receivers distinct from the second pair of receivers.

15. The system of claim 9, wherein:

the receivers of a pair of receivers corresponding to a first phase difference are separated by a first distance; and the receivers of the pair of receivers corresponding to a second phase difference are separated by a second distance.

16. The system of claim 9, wherein:

the plurality of receivers are coupled to a plurality of moving platforms; and the transmitter is coupled to a surface-based platform.

17. A system for estimating the location of a transmitter, comprising:

means for receiving a signal at each receiver of a plurality of receivers, the signal transmitted by a transmitter, the plurality of receivers in motion relative to the transmitter;

means for performing the following for a plurality of pairs of receivers of the plurality of receivers to yield a plurality of phase differences:

establishing a first phase offset of the signal as received at a first receiver of a first pair of receivers;

establishing a second phase offset of the signal as received at a second receiver of the first pair of receivers; and determining a first phase difference corresponding to the first pair of receivers in accordance with the first phase offset and the second phase offset;

means for determining a second phase difference;

means for predicting a predicted second phase difference corresponding to a second pair of receivers in the same manner as the first phase difference was determined;

means for establishing that the first phase difference and the second phase difference correspond to the same cycle of a signal envelope of the signal if the second phase difference matches the predicted second phase difference; and means for estimating a location of the transmitter in accordance with the plurality of phase differences.

18. A system for estimating the location of a transmitter, comprising:

a plurality of receivers, each receiver of the plurality of receivers operable to receive a signal, the signal transmitted by a transmitter, the plurality of receivers in motion relative to the transmitter, wherein:

the plurality of receivers are coupled to a plurality of moving platforms; and the transmitter is coupled to a surface-based platform; and a location estimator in communication with at least one receiver of the plurality of receivers, the location estimator operable to:

perform the following for a plurality of pairs of receivers of the plurality of receivers to yield a plurality of phase differences:

establish a first phase offset of the signal as received at a first receiver of a pair of receivers;

establish a second phase offset of the signal as received at a second receiver of the pair of receivers; and determine a phase difference corresponding to the pair of receivers in accordance with the first phase offset and the second phase offset;

establish that a first phase difference and a second phase difference of the plurality of phase differences correspond to the same cycle of a signal envelope of the signal by:

determining a first phase difference corresponding to a pair of receivers separated by a first distance;

determining a second phase difference corresponding to the pair of receivers separated by a second distance, the second distance being a relative co-prime of the first distance;

performing a modulo technique on the first phase difference and the second phase difference; and establishing that the first phase difference and the second phase difference correspond to the same cycle of a signal envelope of the signal in accordance with the modulo technique by:

predicting a predicted second phase difference; and establishing that the first phase difference and the second phase difference correspond to the same cycle of a signal envelope of the signal if the second phase difference matches the predicted second phase difference; and estimate a location of the transmitter in accordance with the plurality of phase differences by:

determining one or more angles of arrival corresponding to a phase difference of the plurality of phase differences; and estimating the location of the transmitter in accordance with the one or more angles of arrival.

\* \* \* \* \*